3,582,370
GLASS-CERAMIC ARTICLES
George H. Beall, Corning, N.Y., assignor to Corning Glass Works, Corning, N.Y.
No Drawing. Filed Nov. 5, 1968, Ser. No. 773,646
Int. Cl. C03c 3/04, 3/22
U.S. Cl. 106—39DV          3 Claims

ABSTRACT OF THE DISCLOSURE

This invention relates to the manufacture of glass-ceramic articles in the RO-$Al_2O_3$-$SiO_2$ composition field wherein RO consists of MgO and/or CaO and wherein $WO_3$ and, optionally, $MoO_3$ act as nucleating agents. Mullite, $MgWO_4$, $CaWO_4$, $MgMoO_4$, Ca—$MoO_4$ and an as yet unidentified silicate crystal constitute the principal crystal phases.

---

A glass-ceramic article is produced through the controlled crystallization in situ of a glass article. Thus, the manufacture of glass-ceramic articles contemplates three general steps: first, a glass-forming batch is compounded to which a nucleating or crystallization-promoting agent is commonly admixed; second, the batch is fused to a homogeneous melt and the melt simultaneously cooled and shaped to a glass article of a desired configuration; and, third, the glass article is heat treated according to a particular time-temperature schedule such that nuclei are initially developed in the glass which provide sites for the growth of crystals thereon as the heat treatment proceeds.

Inasmuch as this crystallization is effected through the essentially simultaneous growth on countless nuclei, the structure of a glass-ceramic article comprises relatively unniformly-sized, fine-grained crystals homogeneously dispersed in a glassy matrix, these crystals constituting the predominant proportion of the article. Hence, glass-ceramic articles are frequently defined as being at least 50% by weight crystalline and, in many instances, are actually over 75% by weight crystalline. Because of this very high crystallinity, the chemical and physical properties of glass-ceramic products are usually materially different from those of the parent glass and are more closely akin to those exhibited by the crystals. Finally, the residual glassy matrix will have a far different composition from that of the parent glass, since the crystal components will have been precipitated therefrom.

United States Pat. No. 2,920,971, the basic patent in the field of glass-ceramics, furnishes an extensive study of the practical aspects and the theoretical considerations involved in the production of such articles as well as a discussion of the crystallization mechanism and reference thereto is made for further explanation of these factors.

As can be appreciated, the crystal phase developed in glass-ceramic articles depends upon the composition of the parent glass and the heat treatment applied thereto. I have discovered that certain glasses in the RO-$Al_2O_3$-$SiO_2$ composition field wherein RO consists of MgO and/or CaO, when nucleated with $WO_3$ and, optionally, $MoO_3$, can be crystallized in situ to yield glass-ceramic articles having coefficients of thermal expansion ranging between about 25–40×$10^{-7}$/° C. (25°–300° C.) and, where free of extraneous alkali metal oxides, exhibit low dielectric constants and low loss tangents.

In general terms, my invention comprises melting a batch for a glass consisting essentially, by weight on the oxide basis, of about 0–10% RO, 15–35% $Al_2O_3$, 40–70% $SiO_2$, wherein RO consists of 0–10% MgO and 0–8% CaO, and 10–40% $WO_3$+$MoO_3$ wherein $MoO_3$ may be substituted for $WO_3$ in an amount up to about 0–15%, simultaneously cooling the melt at least below the transformation range thereof and shaping a glass article therefrom, and then heating the glass article to a tempertaure between about 800°–1200° C. for a sufficient length of time to attain the desired crystallization in situ. The transformation range is that temperature at which a liquid melt is deemed to have been transformed into an amorphous solid; this temperature commonly being defined as lying between the strain point and annealing point of a glass. Inasmuch as the crystallization in situ is a time and temperature dependent process, it can be readily appreciated that at temperatures within the hotter extreme of the heat treating range only brief dwell periods will be required, i.e., ¼ hour or even less; whereas, in the cooler extreme of the heat treating range, hold times as long as 24–48 hours may be required to attain high crystallinity.

My preferred heat treatment practice contemplates two steps: (1) the glass article is initially heated to a temperature somewhat above the transformation range, e.g., between about 800°–900° C., and held within those temperatures for a sufficient length of time to promote good nucleation and begin crystal growth; and subsequently, (2) the nucleated article is heated to about 950°–1200° C. and maintained within that range for a sufficient period of time to complete crystal growth. In this preferred schedule, I commonly utilize a nucleation time of about 1–6 hours, followed by a crystallization growth time of about 1–8 hours.

It will be appreciated that numerous modifications in the manufacturing technique are applicable. Thus, when the melt is quenched to below the transformation range and shaped to a glass article, this glass article may be cooled all the way to room temperature to allow visual inspection of the glass quality prior to beginning the heat treating schedule. However, where speed in production and fuel economies are desired, the melt may simply be cooled to a glass shape at a temperature just below the transformation range and the heat treating schedule initiated immediately thereafter. Also, whereas a two-step heat treatment practice is preferred, a very satisfactory crystallized article can be obtained when the glass article is merely heated from room temperature or the transformation range to temperatures within the 800°–1200° C. range and held within that range for a sufficient length of time to produce the desired highly crystalline article. In still another embodiment of the invention, no specific hold period at any particular temperature is necessary. Hence, if the rate of heating above the transformation range is relatively slow and the final crystallization temperature near the hotter extreme of the heat treating range, no dwell period, as such, at any one temperature will be required. However, inasmuch as the growth of crystals is dependent upon time and temperature, the rate at which the glass article is heated above the transformation range must not be so rapid that the growth of sufficient crystals to support the article will not have time to occur and the article will, consequently, deform and slump. Hence, although heating rates of 10° C./minute and higher have been utilized successfully, especially where physical supports have been provided for the glass articles to minimize deformation thereof, I prefer to employ heating rates of about 3°–5° C./minute. These heating rates have yielded articles exhibiting very little, if any, deformation throughout the whole field of compositions useful in this invention.

Table I records compositions, expressed in weight percent on the oxide basis, of thermally crystallizable glasses which, when subjected to the heat treatment schedule of this invention, were crystallized in situ to relatively uniformly fine-grained glass-ceramic articles. The ingredients making up the glass batches may be any materials, either oxides or other compounds, which, when melted together, are converted to the desired oxide compositions in the proper proportions. The batch ingredients were compounds, ballmilled together to aid in producing a more homogeneous melt, and thereafter melted in open platinum crucibles for about 16 hours at temperatures between about 1500°–1600° C. Glass cane of about ¼" diameter Table II records the heat treatment schedule to which each glass article was subjected, a visual description of each crystallized article, a measurement of the modulus of rupture, a measurement of the coefficient of thermal expansion (25°–300° C.), a measurement of the dielectric constant at 25° C., 1 kc., a measurement of the loss tangent at 25° C., 1 kc., and the crystal phases present as determined by X-ray diffraction analysis. In each schedule, the temperature was raised at a rate of about 5° C./minute to the hold temperature.

TABLE I

|  | 1 | 2 | 3 | 4 | 5 | 6 |
|---|---|---|---|---|---|---|
| $SiO_2$ | 45 | 61 | 53 | 52 | 47 | 60 |
| $Al_2O_3$ | 20 | 15 | 23 | 23 | 25 | 25 |
| MgO | 5 | 4 | 4 |  | 9 | 5 |
| CaO |  |  |  | 5 |  |  |
| $WO_3$ | 30 | 20 | 20 | 20 | 15 |  |
| $MoO_3$ |  |  |  |  | 4 | 10 |

Tables I and II amply demonstrate the composition and process parameters for producing glass-ceramic articles

TABLE II

| Ex. No. | Heat treatment | Visual description | Modulus of rupture (p.s.i.) | Exp. coeff. (×10⁻⁷/° C.) | Dielectric constant | Loss tangent | Crystal phases |
|---|---|---|---|---|---|---|---|
| 1 | 800° C. for 4 hours; 1,150° C. for 4 hours. | Buff color, glassy surface, cherty fracture. | 12,000 | 140.6 | 5.56 | 0.007 | Mullite, christobalite, $MgWO_4$. |
| 2 | 800° C. for 4 hours; 1,100° C. for 4 hours. | Buff color, glassy surface, waxy fracture. | 10,000 | 26.4 |  |  | Mullite, $MgWO_4$, unidentified phase. |
| 3 | 800° C. for 4 hours; 1,200° C. for 4 hours. | do | 12,000 | 31.1 | 5.61 | .006 | Do. |
| 4 | 800° D. for 4 hours; 1,150° C. for 4 hours. | White color, glassy surface, waxy-cherty fracture fluoresces under ultraviolet. | 10,000 |  |  |  | Mullite, $CaWO_4$. |
| 5 | 800° C. for 4 hours; 1,100° C. for 4 hours. | Gray color, dull surface, fine-grained. | 9,000 |  |  |  | $MgWO_4$, mullite, alpha-quartz. |
| 6 | do | do | 8,000 |  |  |  | Mullite, $MgMoO_4$. | were drawn from each melt and the remainder poured onto a steel plate to give a circular patty about ½" thick. The glass patties were transferred immediately to an annealer operating at about 650° C. Following annealing, the glass articles were placed in an electrically-fired furnace and exposed to the heat treatment schedules reported in Table II. Upon completion of the heat treatment, the current to the furnace was cut off and the crystallized articles were either removed directly from the furnace into the ambient atmosphere or simply left in the furance and permitted to cool to room temperature within the furnace. The rate at which the furnace cooled to room temperature was estimated to average about 3°–5° C./minute.

Although the above-recited amounts of MgO, CaO, $Al_2O_3$, and $SiO_2$ along with the nucleating agent are necessary to obtain a glass-ceramic article containing mullite, $MgWO_4$, $CaWO_4$, $MgMoO_4$, $CaMoO_4$, and/or an unidentified silicate crystal as the principal crystal phases, minor amounts of compatible metal oxides totalling not more than about 10% by weight may be included to aid in melting the batch or to modify the chemical and physical properties of the crystalline article. Hence, additions of ZnO will yield gahnite (ZnO·$Al_2O_3$) and additions of SrO and BaO appear to result in tungstates of those respective metals being formed. In addition, too severe a heat treatment may produce some cristobalite, undesirable because of its high thermal expansion. Additions of $Li_2O$, $Na_2O$, and $K_2O$ adversely affected the electrical properties of the articles and are preferably present in amounts less than about 5% by weight. Pbo, $B_2O_3$, and $P_2O_5$ seem to act as fluxes and are also preferably present in amounts less than about 5% by weight.

The melts of the glasses reported in Table I are quite fluid so no fining agent was utilized. However, in large scale melting practice, a conventional fining agent such as $As_2O_3$ may be added as needed.

according to this invention. The most uniformly fine-grained articles with the best electrical properties are developed from glasses having compositions within the range 3–5% MgO, 18–27% $Al_2O_3$, 45–55% $SiO_2$, and 18–25% $WO_3$, wherein $MoO_3$ may be substituted for $WO_3$ in amounts up to about 15%. Such articles are particularly suitable for use in radomes, insulators, and in other applications where dielectric properties are desired. They may also be useful in refractory metal-glass-ceramic composites.

The crystal content of these glass-ceramic articles exceeds 50% by weight and is usually in excess of about 75% by weight, depending upon the extent to which the components of the batch are adaptable to the formation of crystal phases. The crystals, themselves, are relatively uniformly fine-grained, substantially all being smaller than about 10 microns in diameter and most being smaller than 1 micron in diameter.

Example 1 is my preferred composition which, when exposed to the heat treating schedule set out in Table II, yields a glass-ceramic article which is uniformly very fine-grained and demonstrates excellent electrical properties.

I claim:

1. A thermally crystallizable glass consisting essentially, by weight on the oxide basis, of about 3–10% RO, 15–35% $Al_2O_3$, 40–70% $SiO_2$, wherein RO consists of 0–10% MgO and 0–8% CaO, and 10–40% $WO_3$+$MoO_3$, wherein $MoO_3$ is present in an amount of about 0–15%.

2. A glass-ceramic article consisting essentially of fine-grained crystals of at least one compound selected from the group consisting of mullite and $MgWO_4$ substantially uniformly dispersed in a glassy matrix and comprising the major proportion of the article, said crystals being formed through crystallization in situ from a glass article consisting essentially, by weight on the oxide basis, of about 3–10% RO, 15–35% $Al_2O_3$, 40–70% $SiO_2$, wherein RO consists of 0–10% MgO and 0–8% CaO, and 10–40%

$WO_3+MoO_3$, wherein $MoO_3$ is present in an amount of about 0–15%.

3. A glass-ceramic article according to claim 2 wherein said glass article consists essentially of about 3–5% MgO, 18–27% $Al_2O_3$, 45–55% $SiO_2$, and 18–25% $WO_3+MoO_3$, wherein $MoO_3$ is present in an amount of about 0–15%.

References Cited

FOREIGN PATENTS 1,028,872    5/1966    Great Britain ........ 106—39

OTHER REFERENCES

McMillan: Glass-Ceramics (1964), Academic Press, London, p. 71.

HELEN M. McCARTHY, Primary Examiner

U.S. Cl. X.R.

65—33; 106—52